(12) United States Patent
Heidemann et al.

(10) Patent No.: US 9,323,025 B2
(45) Date of Patent: Apr. 26, 2016

(54) KINEMATIC MOUNT

(75) Inventors: Rainer Heidemann, Munich (DE); Frank Lison, Gauting (DE)

(73) Assignee: TOPTICA Photonics AG, Graefelfing (DE)

( * ) Notice: Subject to any disclaimer, the term of this patent is extended or adjusted under 35 U.S.C. 154(b) by 946 days.

(21) Appl. No.: 13/378,161

(22) PCT Filed: Jun. 15, 2010

(86) PCT No.: PCT/EP2010/003589
§ 371 (c)(1),
(2), (4) Date: Feb. 28, 2012

(87) PCT Pub. No.: WO2010/145803
PCT Pub. Date: Dec. 23, 2010

(65) Prior Publication Data
US 2012/0145872 A1  Jun. 14, 2012

(30) Foreign Application Priority Data
Jun. 15, 2009  (DE) .......................... 10 2009 025 309

(51) Int. Cl.
*A47G 1/24* (2006.01)
*G02B 7/182* (2006.01)

(52) U.S. Cl.
CPC .............. *G02B 7/1822* (2013.01); *G02B 7/182* (2013.01); *G02B 7/1825* (2013.01); *G02B 7/1827* (2013.01)

(58) Field of Classification Search
CPC ..................................................... G02B 7/1822
USPC ............................ 248/478, 487; 359/872, 874
See application file for complete search history.

(56) References Cited

U.S. PATENT DOCUMENTS

| | | | | |
|---|---|---|---|---|
| 3,204,471 A | * | 9/1965 | Rempel | 359/274 |
| 3,359,812 A | * | 12/1967 | Everitt | 359/874 |
| 3,402,613 A | * | 9/1968 | Neusel et al. | 74/89.35 |
| 3,407,018 A | | 10/1968 | Miller | |
| 3,428,915 A | * | 2/1969 | Leone et al. | 372/107 |

(Continued)

FOREIGN PATENT DOCUMENTS

| | | |
|---|---|---|
| JP | 3 005113 | 1/1991 |
| JP | 3 005114 | 1/1991 |
| JP | 7 036115 | 2/1995 |

OTHER PUBLICATIONS

International Search Report in PCT/EP2010/003589 dated Dec. 3, 2010.

(Continued)

*Primary Examiner* — Joshua J Michener
*Assistant Examiner* — Chiedu Chibogu
(74) *Attorney, Agent, or Firm* — Collard & Roe, P.C.

(57) ABSTRACT

The invention relates to a kinematic mount having a base part (8) and a bracket part (7), which is positioned on the base part (8), and which is tiltable relative thereto around at least one tilting axis. The invention provides that the mount has at least one pivot lever (22, 23), which is connected to the base part (8) by way of a first joint (25), and which is connected to the bracket part (7) by way of a second joint (27, 24, 28), which is spaced apart from the first joint (25) in a longitudinal direction of the pivot lever (22, 23). The base part (8), the pivot lever (22, 23), and the bracket part (7) form a gear unit, which converts a movement of an actuator (11, 12) impacting the pivot lever (22, 23) into a tilting of the bracket part (7) relative to the base part (8).

10 Claims, 4 Drawing Sheets

(56) References Cited

U.S. PATENT DOCUMENTS

| | | | | |
|---|---|---|---|---|
| 3,436,050 | A * | 4/1969 | Camp, Jr. | 248/487 |
| 3,596,863 | A * | 8/1971 | Kaspareck | 359/871 |
| 3,686,964 | A * | 8/1972 | Thibaut et al. | 74/110 |
| 3,700,313 | A * | 10/1972 | Karr et al. | 359/873 |
| 3,814,365 | A * | 6/1974 | Mackenzie | 248/278.1 |
| 4,401,288 | A * | 8/1983 | Thompson | 248/476 |
| 4,442,524 | A * | 4/1984 | Reeder et al. | 372/107 |
| 4,621,899 | A * | 11/1986 | Hoult et al. | 359/896 |
| 4,664,488 | A * | 5/1987 | Sawicki | G02B 26/0825 359/849 |
| 4,818,089 | A * | 4/1989 | Mefferd | 359/872 |
| 4,832,452 | A * | 5/1989 | Eisler | 359/813 |
| 4,914,797 | A * | 4/1990 | Tsuchida et al. | 29/281.1 |
| 5,004,205 | A * | 4/1991 | Brown et al. | 248/476 |
| 5,117,589 | A * | 6/1992 | Bischoff et al. | 451/405 |
| 5,168,617 | A * | 12/1992 | Tsuchida et al. | 29/281.1 |
| 5,323,712 | A * | 6/1994 | Kikuiri | 108/20 |
| 5,400,674 | A * | 3/1995 | Arnone et al. | 74/490.13 |
| 5,561,728 | A * | 10/1996 | Kobayashi et al. | 385/97 |
| 5,583,691 | A * | 12/1996 | Yamane et al. | 359/393 |
| 5,859,947 | A * | 1/1999 | Kiryuscheva et al. | 385/136 |
| 5,966,987 | A * | 10/1999 | Yoon et al. | 74/89.23 |
| 6,459,474 | B1 * | 10/2002 | Okada | 355/78 |
| 6,744,575 | B1 * | 6/2004 | Andrews | 359/819 |
| 6,972,904 | B2 * | 12/2005 | Bratt et al. | 359/558 |
| 2007/0103802 | A1 * | 5/2007 | Arnone et al. | 359/872 |

OTHER PUBLICATIONS

English Translation of International Preliminary Report on Patentability and Written Opinion of the International Searching Authority in PCT/EP2010/003589 dated Dec. 16, 2011.

* cited by examiner

KINEMATIC MOUNT

CROSS REFERENCE TO RELATED APPLICATIONS

This application is the National Stage of PCT/EP2010/003589 filed on Jun. 15, 2010, which claims priority under 35 U.S.C. §119 of German Application No. 10 2009 025 309.2 filed on Jun. 15, 2009, the disclosure of which is incorporated by reference. The international application under PCT article 21(2) was not published in English.

The invention relates to a kinematic holder having a base part and a holding part that is mounted on the base part and can be tilted relative to the latter about at least one tilting axis.

Such kinematic holders are used, for example, for adjustable mounting of optical elements. Use of kinematic holders for adjustable mounting of optical elements such as mirrors, for example, in laser systems is usual. Such kinematic holders are also referred to as mirror holders or cardanic mirror holders.

Figure 1:
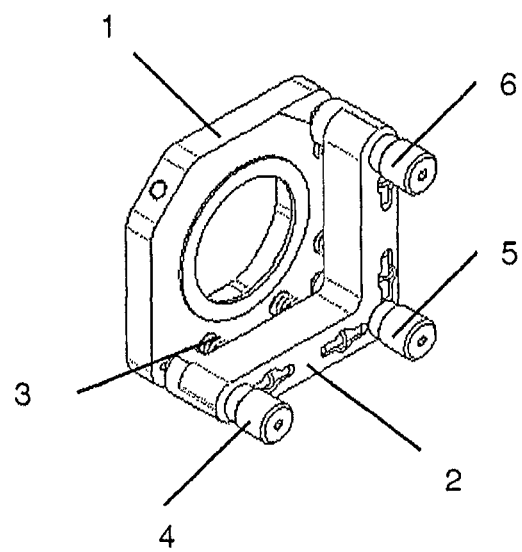

FIG. 1 shows an isometric view of a kinematic mirror holder known from the state of the art. This comprises a tiltable holding part 1 having a central circular bore, in which a mirror to be held in adjustable manner can be attached. The holding part 1 is mounted on a base part 2. Holding part 1 and base part 2 are biased with regard to one another, by way of tension springs 3. The base part 2 has three bores provided with inside threads, in which control spindles 4, 5, and 6 in the form of screws are guided. On the side facing the holding part 1, the spindles 4, 5, and 6 have hemispherical ends or ball ends. A desired relative tilting position of the holding part 1 with regard to the base part 2 is obtained in that the three spindles 4, 5, and 6 are adjusted accordingly.

In a typical optical setup, the surface of a mirror held by means of a kinematic holder is (almost) vertical and must be adjusted relative to a horizontally oriented optical table. The control spindles 4, 5, and 6 shown in FIG. 1 then extend horizontally, i.e. perpendicular to the mirror surface. In the case of the previously known holder, adjustment then takes place by means of the spindles 4, 5, and 6, from the back or from the front of the mirror. For the adjustment, the spindles 4, 5, and 6 must be freely accessible. For this reason, the optical setup cannot be structured to be as compact as desired. It is disadvantageous, to express it differently, that in the case of a compact optical setup, adjustment of the previously known and kinematic mirror holder is made difficult due to lack of sufficient accessibility of the control spindles 4, 5, and 6. In order to circumvent these problems, additional adjustment tools can be used. However, the use of adjustment tools is problematic, because no signal for the adjustment is present any longer if the beam path is interrupted. Furthermore, when working with great power, such as, for example, in the case of laser resonators, the use of adjustment tools can be hazardous. Against this background, it is the task of the invention to make available an improved kinematic holder.

This task is accomplished by the invention, proceeding from a kinematic holder of the type stated initially, in that the holder has at least one pivot lever that is connected with the base part by way of a first joint and with the holding part by way of a second joint that is spaced apart from the first joint, in the longitudinal direction of the pivot lever, whereby the base part, the pivot lever, and the holding part form a gear mechanism that converts a movement of a control unit that acts on the pivot lever into tilting of the holding part relative to the base part.

The gear mechanism of the kinematic holder according to the invention, formed from the base part, the pivot lever, and the holding part, makes it possible to dispose the control unit in a position where it is easily accessible. For example, in the case of a mirror holder that is intended for a horizontally oriented optical setup, the gear mechanism can be designed in such a manner that the control unit is situated at the top of the holder. Tilting of the holding part relative to the base part can then be adjusted from the top, so that free regions around the optical holder, which are supposed to ensure accessibility of the control unit, are no longer required. The optical setup can be structured in correspondingly compact manner.

Furthermore, it is advantageous that the adjustment process can be carried out without interrupting the beam path of the light in the optical setup. The kinematic holder can be oriented, as needed, in such a manner that the control unit is situated at the top or on one of the sides.

Another advantage of the kinematic holder according to the invention is that it can be used as a control unit for automatic adjustment, in very simple manner, by means of using suitable actuators (servomotors, linear motors, stepper motors, piezo drives, etc.). If the holder is oriented for adjustment from above, the actuators can be affixed at the top of the holder. This has the advantage that the waste heat of the actuators is not introduced into the optical system.

In a preferred embodiment of the kinematic holder according to the invention, it is provided that the holder comprises two pivot levers, namely a first pivot lever and a second pivot lever, as well as a first control unit and a second control unit, whereby the base part, the first pivot lever, and the holding part form a first gear mechanism that converts a movement of the first control unit, which acts on the first pivot lever, into tilting of the holding part relative to the base part, about a horizontal tilting axis, and whereby the base part, the second pivot lever, and the holding part form a second gear mechanism that converts a movement of the second control unit, which acts on the second pivot lever, into tilting of the holding part relative to the base part, about a vertical tilting axis. In this embodiment, a cardanic mounting is obtained, in which the tilting about the horizontal tilting axis and the tilting about the vertical tilting axis can be adjusted independent of one another, by means of the corresponding control units. In the holder according to the invention, only one control unit per tilting axis needs to be activated, and this is a significant advantage as compared with the state of the art. By means of this embodiment, a significant disadvantage of conventional kinematic holders is furthermore overcome, which consists in that tilting about an axis by means of activation of only one control unit is always accompanied by an offset of the held optical element in the axial direction, i.e. in a direction perpendicular to the vertical and horizontal tilting axis. In order to avoid this offset, all the control units must always be activated at the same time in the case of conventional kinematic holders, and this is complicated and difficult. This is not necessary in the case of the kinematic holder according to the invention. Offset does not occur, because the gear mechanisms of the holder can be designed in such a manner, as mentioned above, that independent tilting about the horizontal and the vertical tilting axis is possible by means of the corresponding control units. An optical element can then be attached to the holding part in such a manner that the intersection point of the tilting axes is situated on the surface of the optical element (e.g. of the mirror). In this manner, an offset of the optical element that accompanies adjustment is excluded. This is advantageous for mounting of the most varied optical elements, such as, for example, mirrors, delay plates, lenses, etc.

Preferably, in the case of the embodiment of the kinematic holder according to the invention described above, the second joint of the first pivot lever is disposed essentially on the vertical tilting axis, while the second joint of the second pivot lever is disposed essentially on the horizontal tilting axis. In this embodiment, the pivot levers engage on the holding part, by way of their second joints, at an angle distance of essentially 90° with regard to the intersection point of the tilting axes. When the first control unit is activated, the first pivot lever engages on the holding part by way of its second joint, and thereby brings about tilting of the holding part about the horizontal tilting axis defined by the second joint of the second pivot lever. The same holds true analogously for tilting of the holding part about the vertical tilting axis, which is then defined by the second joint of the first pivot lever.

The first or the second pivot lever can be connected with the holding part by way of a third joint, whereby the first joint is disposed centered between the second and the third joint, in the longitudinal direction of the pivot lever. In this embodiment, the holding part is connected with one of the pivot levers by way of two joints and with the other holding part by way of one joint. The connection of the holding part with the pivot levers that bring about tilting, by way of a total of three link points, ensures stable and well-defined fixation of the horizontal and vertical tilting axes.

In a practical embodiment of the kinematic holder according to the invention, the control units are control spindles that are guided on the base part by way of threads, whereby the longitudinal axes of the control spindles are oriented parallel to one another and essentially parallel to the vertical plane defined by the two tilting axes. In this embodiment, the gear mechanisms formed by base part, pivot lever, and holding part ensure that the longitudinal movements of the control spindles are converted to longitudinal movements of the link points of the pivot levers on the holding part, offset by 90°, in order to bring about the desired tilting, in each instance. This embodiment can be utilized to carry out an adjustment of an optical element attached to the holding part, from above or from the side, in the case of a horizontal optical setup. In this connection, a particularly practical implementation possibility consists in that the ends of the control spindles engage on the pivot levers by way of flat surfaces formed on the pivot levers. For this purpose, the pivot levers can be structured in L shape or T shape, for example.

In another preferred embodiment of the kinematic holder according to the invention, it is provided that the holding part is mounted on the base part by way of holding joints that essentially prevent a horizontal or vertical movement parallel to the tilting axes. In this embodiment, the holding joints ensure that the holding part does not perform any undesired movement in the vertical plane formed by the horizontal and vertical tilting axis. The holding joints allow only a relative movement of the holding part with regard to the base part in the axial direction, i.e. in a direction perpendicular to the vertical and horizontal tilting axis. This axial mobility allows tilting of the holding part relative to the base part. Preferably, the holding part is connected with the base part by way of multiple holding joints, on its circumference edge.

In another preferred embodiment, the joints of the kinematic holder according to the invention are solid body joints, whereby the base part is configured monolithically with the at least one pivot, lever. The monolithic configuration allows a compact structure of the kinematic holder, which is furthermore not sensitive to vibrations, is temperature-stable, and can be produced in advantageous manner. The monolithic production method (for example by means of wire erosion) furthermore allows simple scaling with regard to the dimensions of the kinematic holder, up to a very small and extremely compact structure. It is practical if the first and the second joint of the at least one pivot lever are rotary joints, whereby the first joint has one freedom of rotation and the second joint has two freedoms of rotation. For the first joint, one freedom of rotation is sufficient, because the first joint is only responsible for the pivot movement of the pivot lever during implementation of the movement of the control unit for tilting about the corresponding axis. The second joint, which connects the pivot lever with the holding part, must have two freedoms of rotation, so that tilting about two different tilting axes is possible.

Figure 2:
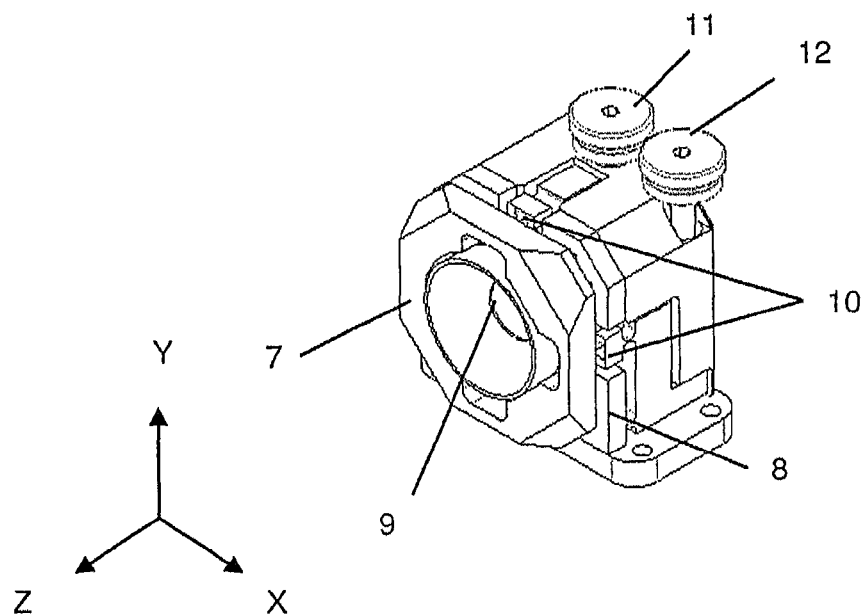
Figure 3:
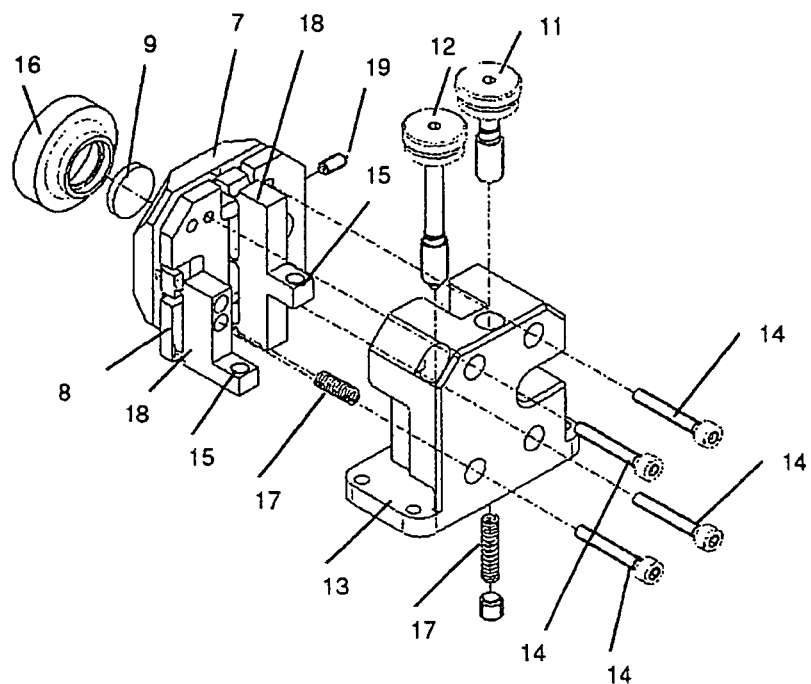
Figure 4:
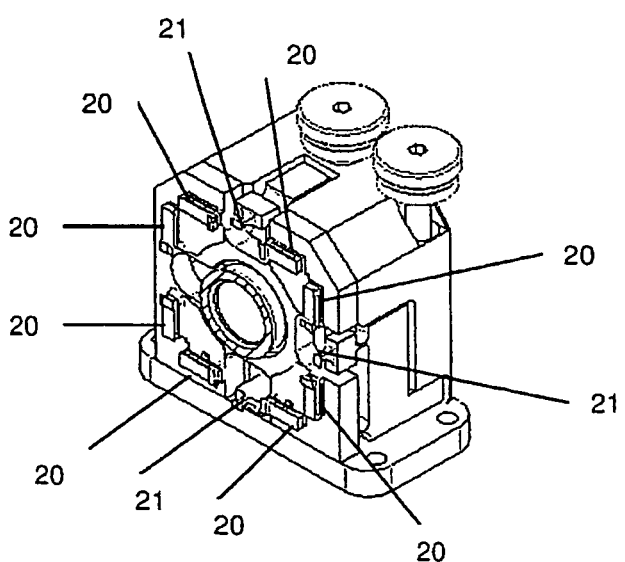
Figure 5:
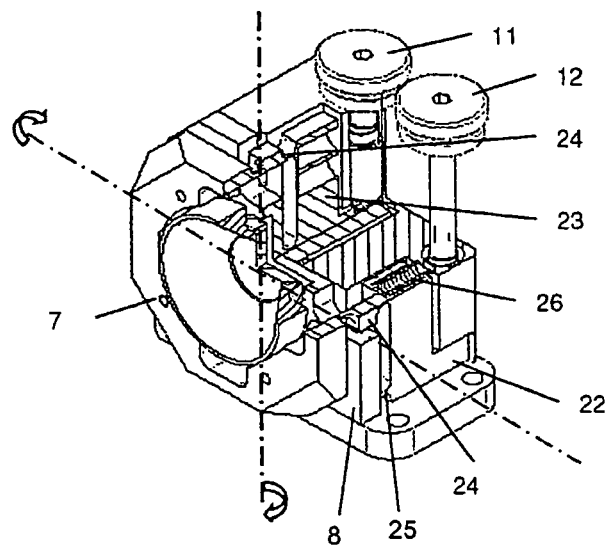
Figure 6:
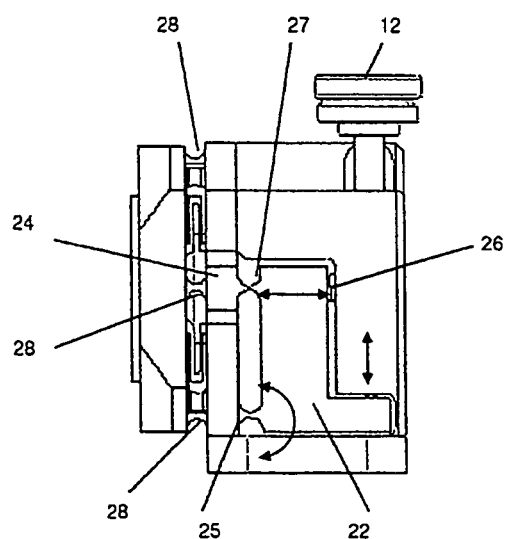
Figure 7:
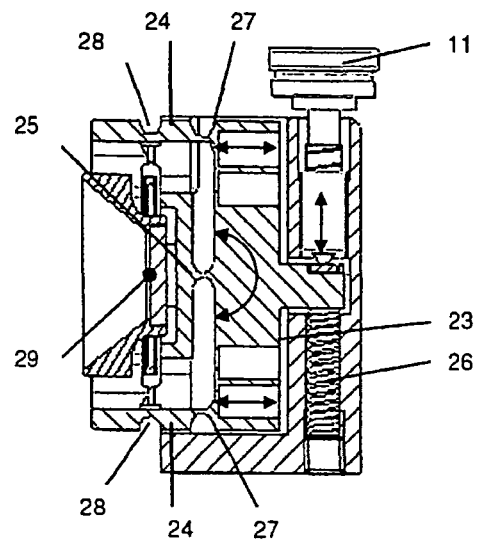
Figure 8:
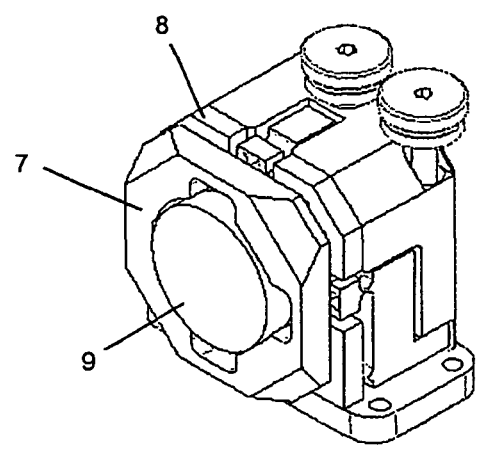

Exemplary embodiments of the invention will be explained in greater detail in the following, using the drawings. These show:

FIG. 1: isometric view of a kinematic mirror holder known from the state of the art;

FIG. 2: isometric view of a mirror holder according to the invention;

FIG. 3: exploded view of the mirror holder according to FIG. 2;

FIG. 4: representation of the solid body joints of the mirror holder;

FIG. 5: isometric view, partly in section, of the mirror holder;

FIG. 6: illustration of the function in the case of horizontal tilting;

FIG. 7: illustration of the function in the case of vertical tilting;

FIG. 8: alternative exemplary embodiment of the mirror holder.

FIG. 2 is an isometric view, and FIG. 3 is an isometric exploded view of a kinematic mirror holder according to the invention. The holder comprises a holding part 7 that is mounted on a base part 8. A mirror 9 is attached to the holding part 7 by way of an adapter 16. The mirror 9 is fixed in place on the adapter 16 by means of a clamping screw 19. The mirror 9 can be tilted relative to the base part 8 with the holding part 7. In the exemplary embodiment shown, the base part 8 is configured monolithically with the holding part 7. In this connection, holding part 7 and base part 8 are connected with one-another by way of a system of solid body joints that are indicated as a whole with 10 in FIG. 2. Two control spindles 11 and 12 serve as control units for adjustment of the relative tilting of holding part 7 and base part 8; in the exemplary embodiment shown, they are accessible from the top. The control spindles 11 and 12 are guided on a base carrier 13, which is firmly connected with the base part 8, by way of threads. In the exemplary embodiment shown, the base carrier 13 is screwed together with the base part 8, by way of screws 14, to form a compact component. The lower ends of the control spindles 11 and 12 engage with the pivot levers 18, indicated as a whole with 18 in FIG. 3, by way of flat surfaces 15. Springs indicated with 17 in FIG. 3 produce a bias between the base carrier 13, the pivot levers 18, and the control spindles 11 and 12.

FIGS. 4 to 7 illustrate the embodiment of the adjustment mechanism of the mirror holder as well as its function. The holding part 7 is mounted on the base part 8 by way of holding joints 20. The holding joints 20 prevent movement of the holding part 7 relative to the base part 8 in the x and y direction (see coordinate system in FIG. 2). In this way, the holding part 7 is fixed in place on the base part 8. In the exemplary embodiment shown, the holding joints 20 are configured as double-plate joints with joint plates in the x-y plane. As can be seen in FIG. 4, the holding joints 20 connect the holding part 7 with the base part 8 in the region of its circumference edge. Control joints indicated as a whole with 21 in FIG. 4, which joints also connect the holding part 7 with the base part 8, bring about tilting of the base part 7 relative to the base part 8 about the horizontal and vertical tilting axis shown in FIG. 5.

The control joints 21, in each instance, comprise a first pivot lever 23 and a second pivot lever 22, as well as connection rods 24 (see FIGS. 5 to 7) and rotary joints 25, 27, and 28. The pivot levers 22 and 23 serve to convert the vertical linear movement of the control spindles 11 and 12 into a horizontal movement. For this purpose, the pivot levers 22 and 23 are connected with the base part 8 by way of a first joint 25, in each instance. In the exemplary embodiment shown, the first pivot lever 23 has a T shape, while the second pivot lever 22 has an L shape. When the horizontal shank of a pivot lever 22 or 23 is pressed downward by means of the corresponding control spindle 11 or 12, the vertical shank, in each instance, moves around the solid body rotary joint 25 in the form of a pivot movement. Pressure springs indicated with 26 in FIGS. 6 and 7 bring about the corresponding movement in the opposite direction, in each instance. In the exemplary embodiment shown, the first pivot lever 23 is disposed centered, and the second pivot lever 22 is disposed on the side of the kinematic holder.

The pivot levers 22, 23 are connected with the holding part 7 by way of the connection rods 24. The exemplary embodiment shown comprises a total of three such connection rods. A first rod is disposed at the upper end of the vertical shank of the second pivot lever 22, a second rod at the lower end of the first pivot lever 23, and a third rod at the upper end of the first pivot lever 23. The connection with the holding part 7 takes place by way of joints 27. These joints are rigid in the z direction and allow a rotation about the horizontal axis, perpendicular to the movement direction. The other side of the rod 24, in each instance, is connected with the holding part 7 by way of a rotary joint 28. The rotary joint 28 is rigid in the z direction, but allows rotation about the x and y axis. The combination of joint 27, rod 24, and joint 28 forms a second or third joint in the sense of the invention, in each instance.

The positioning of the link points, i.e. the connection points between the holding part 7 and the pivot levers 22, 23, shown in the figures, in combination with the configuration of the pivot levers 22 and 23 as an L lever and a T lever, respectively, allows uncoupled tilting about the vertical and horizontal tilting axis.

The upper and the lower connection point of the first pivot lever 23, i.e. the second and third joints in the sense of the invention, define the vertical tilting axis; in this connection, the second and third joints are placed horizontally centered, vertically symmetrically, about the horizontal tilting axis, at the top and the bottom. The connection point between the first pivot lever 22 and the holding part 7 is placed vertically centered, horizontally to the side. The connection rod 24 of the second pivot lever 22 moves one side of the holding part 7 forward and back. This movement results in tilting about the vertical tilting axis. In this connection, the connection points indicated with 28 in FIGS. 6 and 7 simultaneously experience a tensile stress and a shear stress, respectively. However, because the articulated connection points 28 are connected by means of the rigid first pivot lever 23, no translational movement of the holding part 7 takes place, but rather rotation takes place, i.e. the desired tilting about the vertical tilting axis.

The horizontal tilting axis is determined by the connection point between the second pivot lever 22 and holding part 7, as well as by the rotation point 29 shown in FIG. 7, which lies in the center point between the two connection points 28 (see FIG. 7). Because the forward movement of the one (for example the upper) connection point 28 is equal to the backward movement of the other (for example the lower) connection point 28, the second pivot lever 22 does not experience any resulting force. Once again, pure tilting takes place.

The invention described above makes available a kinematic holder that can be produced monolithically, can be operated from above or from the side, and allows cardanic tilting of the mounted component. Furthermore, the invention allows a compact and cost-advantageous structure, not sensitive to vibrations, of the kinematic holder. The holder can easily be adjusted in automated manner, by adding suitable actuators, for example piezo actuators, as a replacement for the control spindles shown in the figures.

The control units of the kinematic holder according to the invention have a pure control function and, contrary to kinematic holders known from the state of the art, do not also serve to guide the holding part relative to the base part. This results in improved stability, above all under shock stress.

The cardanic mounting is advantageous, above all, for optical applications, because this makes it possible to tilt the light beam without changing the optical path.

The kinematic holder according to the invention allows a construction in which the holding part is connected with the base part at its edge. This allows positioning the component to be mounted, for example a mirror, at the intersection of the tilting axes. This precludes beam offset during adjustment of the tilt. Even if the optical element is installed slightly offset in the z direction, the beam offset is many times less than in the case of conventional kinematic holders. Such an embodiment is shown in FIG. 8. In this embodiment, the surface of the mirror 9, which is affixed to the holding part 7 without an adapter, is further forward in the z direction.

Finally, it should be mentioned that in the construction shown in the figures, the reset springs 17 and 26, respectively, in contrast to kinematic holders known from the state of the art, do not put stress on the holding part directly. For this reason, the holding part is not deformed, something that is very advantageous in the case of optical applications, particularly for mounting of polarization optics or lenses.

The invention claimed is:

1. A kinematic holder comprising:
   a base part,
   a holding part that is mounted on the base part and can be tilted relative to the base part,
   a first pivot lever and a second pivot lever that are each connected with the base part by way of a first joint, and are each connected with the holding part by way of a second joint that is spaced apart from the first joint, in a longitudinal direction of the pivot levers, and
   a first control unit and a second control unit,
   wherein the base part, the first pivot lever, and the holding part form a first tilting mechanism that converts a movement of the first control unit, which acts on the first pivot lever, into tilting of the holding part relative to the base part, about a horizontal tilting axis,
   wherein the base part, the second pivot lever, and the holding part form a second tilting mechanism that converts a movement of the second control unit, which acts on the second pivot lever, into tilting of the holding part relative to the base part, about a vertical tilting axis, and
   wherein the control units comprise control spindles that are guided on the base part or on a part connected with the base part by way of threads, and wherein longitudinal axes of the control spindles are oriented parallel to one another and essentially parallel to a vertical plane defined by the two tilting axes.

2. The kinematic holder according to claim 1, wherein the second joint of the first pivot lever is disposed essentially on the vertical tilting axis, and the second joint of the second pivot lever is disposed on the horizontal tilting axis.

3. The kinematic holder according to claim 1, wherein the first pivot lever is connected with the holding part by way of a third joint, wherein the first joint is disposed centered between the second and the third joint, in the longitudinal direction of the first pivot lever.

4. The kinematic holder according to claim 1, wherein ends of the control spindles engage on the pivot levers by way of flat surfaces formed on the pivot levers.

5. The kinematic holder according to claim 1, wherein the holding part is mounted on the base part by way of holding joints that prevent a horizontal or vertical movement parallel to the tilting axes.

6. The kinematic holder according to claim 1, wherein the joints are solid body joints, and wherein the base part is monolithically configured with the holding part and with the pivot levers.

7. The kinematic holder according to claim 6, wherein the first and the second joints are rotary joints, wherein the first joint has one freedom of rotation and the second joint has two freedoms of rotation.

8. The kinematic holder according to claim 1, wherein an optical element is attached to the holding part, and wherein an intersection point of the tilting axes is situated on a surface of the optical element.

9. The kinematic holder according to claim 8, wherein the optical element is a mirror, a delay plate, or a lens.

10. The kinematic holder according to claim 1, wherein the control units each comprise an actuator.

\* \* \* \* \*